United States Patent [19]

Bekki et al.

[11] Patent Number: 4,847,611
[45] Date of Patent: Jul. 11, 1989

[54] RING CONFIGURATION OF LINE CONCENTRATORS

[75] Inventors: Yoshinori Bekki; Hiroyuki Wada, both of Hadano; Mitsuhiro Yamaga, Kawasaki; Susumu Nakayashiki, Yokohama, all of Japan

[73] Assignee: Hitachi, Ltd., Tokyo, Japan

[21] Appl. No.: 86,821

[22] Filed: Aug. 19, 1987

[30] Foreign Application Priority Data

Aug. 25, 1986 [JP] Japan ................................. 61-197117

[51] Int. Cl.4 ........................... H04Q 9/00; H04J 3/02
[52] U.S. Cl. ................................. 340/825.050; 370/16
[58] Field of Search ...................... 340/825.05; 370/16, 370/86, 17; 455/9; 371/11

[56] References Cited

U.S. PATENT DOCUMENTS

| 4,510,493 | 4/1985 | Bux et al. | 340/825.05 |
| 4,567,482 | 1/1986 | Dolsen et al. | 340/825.05 |
| 4,623,884 | 11/1986 | Ihara et al. | 340/825.05 |

Primary Examiner—Donald J. Yusko
Attorney, Agent, or Firm—Antonelli, Terry & Wands

[57] ABSTRACT

In a ring communications system including a plurality of line concentrators that are connected in the form of a ring, the line concentrators are connected together via a main ring, and the terminal stations connected to the line concentrators are connected to the main ring via ring subsidiaries. The main ring and the ring subsidiaries are connected together via ring connection switches that so work as to connect or disconnect the main ring and the ring subsidiaries. The ring connection switch is so constructed as to maintain the connected condition even when the power source of the line concentrator is in the turned-off state.

3 Claims, 2 Drawing Sheets

RING CONFIGURATION OF LINE CONCENTRATORS

The present invention relates to a network having a ring transmission line, and particularly to a system for constituting ring subsidiaries of line concentrators which accommodate a plurality of terminal devices.

BACKGROUND OF THE INVENTION

A conventional ring transmission line system can be represented by a local area network based upon the token ring technique as is disclosed, for example, in a journal "BIT", Vol. 16, No. 3, 1984.

According to this literature, a passive wiring concentrator or a station (ST) is directly connected to a ring subsidiary (called robe in this literature) of the line concentrator (called active ring concentrator (AWC) in this literature). In this literature, however, consideration has not been sufficiently given to the relay connection and to the structure thereof between the line concentrator and the ring subsidiary. That is, when the power source of the line concentrator connected to the main ring is turned off, a by-pass function of the line concentrator works to separate the ring subsidiary from the main ring in the line concentrator. Therefore, a terminal station connected to the ring subsidiary is not allowed to continue the communication.

According to the above-mentioned conventional art, a terminal station connected to the ring subsidiary is not allowed to continue the communication under the condition where the power source of the line concentrator is turned off, resulting in the interruption of the communication function of the terminal station connected to the ring subsidiary of the line concentrator.

SUMMARY OF THE INVENTION

The object of the present invention is to maintain the communication of a terminal station connected to the ring subsidiary even under the condition where the power source of the line concentrator is turned off.

The above object is achieved by so constituting the ring connection switch which connects the main ring in the line concentrator to the ring subsidiary such that the ring subsidiary is incorporated in the main ring under the condition where the power source of the line concentrator is turned off.

DESCRIPTION OF THE PREFERRED EMBODIMENT

An embodiment of the invention will now be described in conjunction with the drawings.

Figure 1:
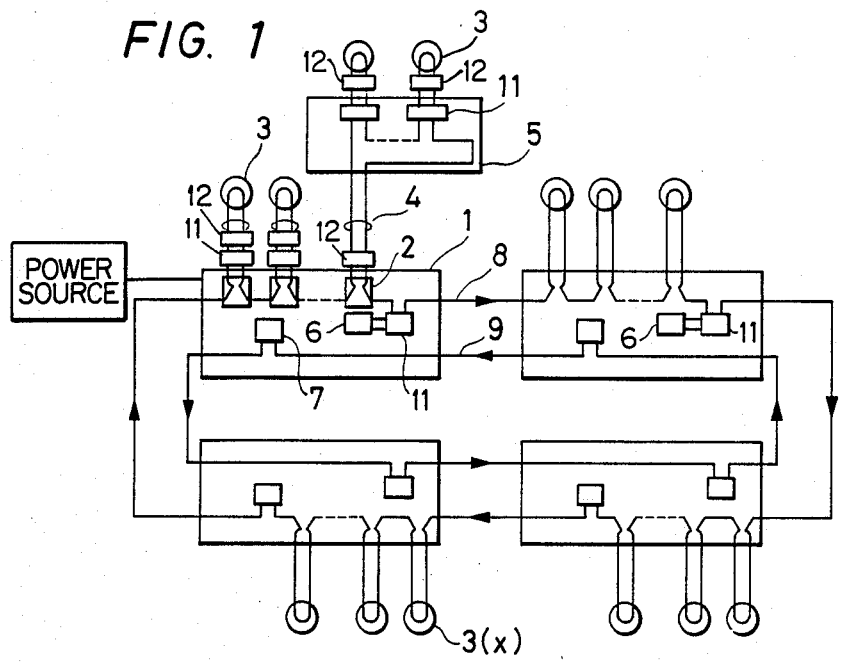
FIG. 1 is a diagram illustrating the whole structure of a ring communication system according to an embodiment of the present invention.

FIG. 1 is a diagram illustrating the whole structure of a system according to this embodiment, wherein reference numeral 1 denotes a line concentrator, 3 denotes terminal stations, 5 denotes a terminal branch box connected to the line concentrator 1, 8 and 9 denote a double transmission line wherein 8 denotes a main ring and 9 denotes an auxiliary ring, each constituting a closed ring. In the line concentrator 1, reference numeral 2 denotes ring connection switches, 4 denotes a ring subsidiary, 6 denotes a master station which is connected to the master ring and which controls the line concentrator 1, and reference numeral 7 denotes a master station which is connected to the auxiliary ring 9 to carry out the control operation. Employment of the terminal branch box 5 makes it possible to connect a plurality of terminal stations 3 in line to the ring subsidiary 4.

Figure 2:
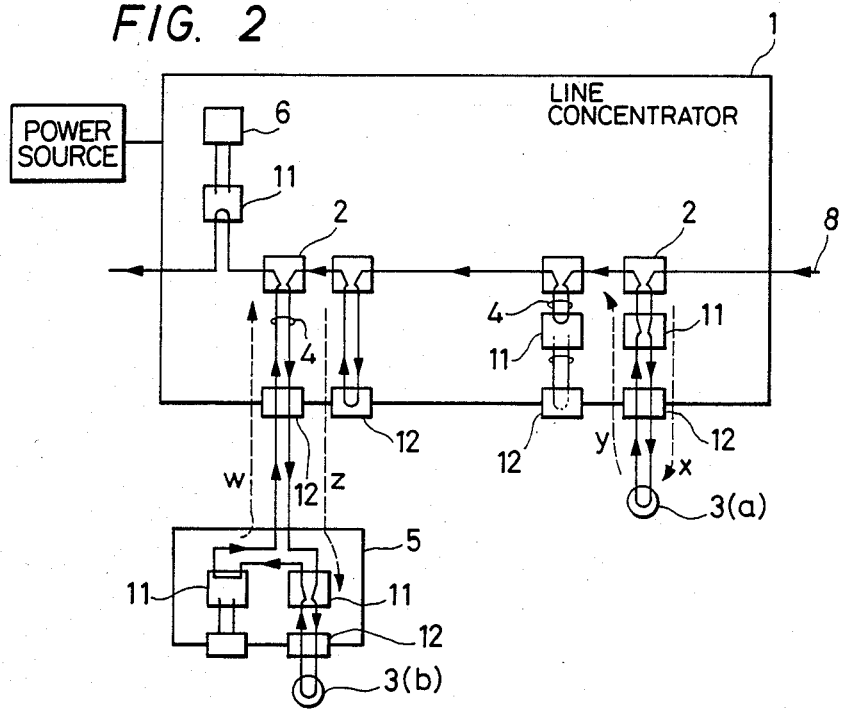
FIG. 2 is a diagram illustrating the internal structure of the line concentrator.

FIG. 2 is a diagram illustrating the internal structure of the line concentrator 1, wherein reference numeral 11 denotes a terminal connector for connecting the terminal station 3 to the main ring 8, and 12 denotes a media connector which forms a connection port for connecting the terminal station 3 or the terminal branch box 5 to the line concentrator 1.

Operation of this embodiment will now be described. When the power source for the line concentrator 1 shown in FIG. 2 is turned off, the master station 6 is disconnected from the terminal connector 11 and is not connected to the main ring 8. With the power source for the line concentrator 1 being turned off, furthermore, the ring connection switch 2 so works as to incorporate the ring subsidiary 4 in the main ring 8, such that data signals on the main ring 8 will flow onto the ring subsidiary 4. Therefore, when, for example, a terminal station 3(a) is inserted in the ring to make communication with other terminal stations, the data signals flowing on the main ring 8 enter into the terminal station 3(a) via ring connection switch 2, terminal connector 11 and media connector 12 (via a route indicated by arrow x). Further, the data signals can be sent from the terminal station 3(a) back to the main ring 8 via another route (indicated by arrow y) to make communication with other terminal stations. Even when the terminal branch box 5 is connected to the ring subsidiary 4, the data signals flowing on the main ring 8 enter into a terminal station 3(b) via the ring connection 2, media connector 12, and terminal connector 11 in the terminal branch box 5 (via a route indicated by arrow Z). The data signals can be sent from the terminal station 3(b) back to the main ring (8) (via a route indicated by arrow W), so that the terminal station 3(b) is allowed to make communications with other terminal stations. In the subsidiary to which no terminal station is connected, the data signals are folded back at the terminal connector 11 or the media connector 12 to form a closed loop of the main ring 8.

Figure 3:
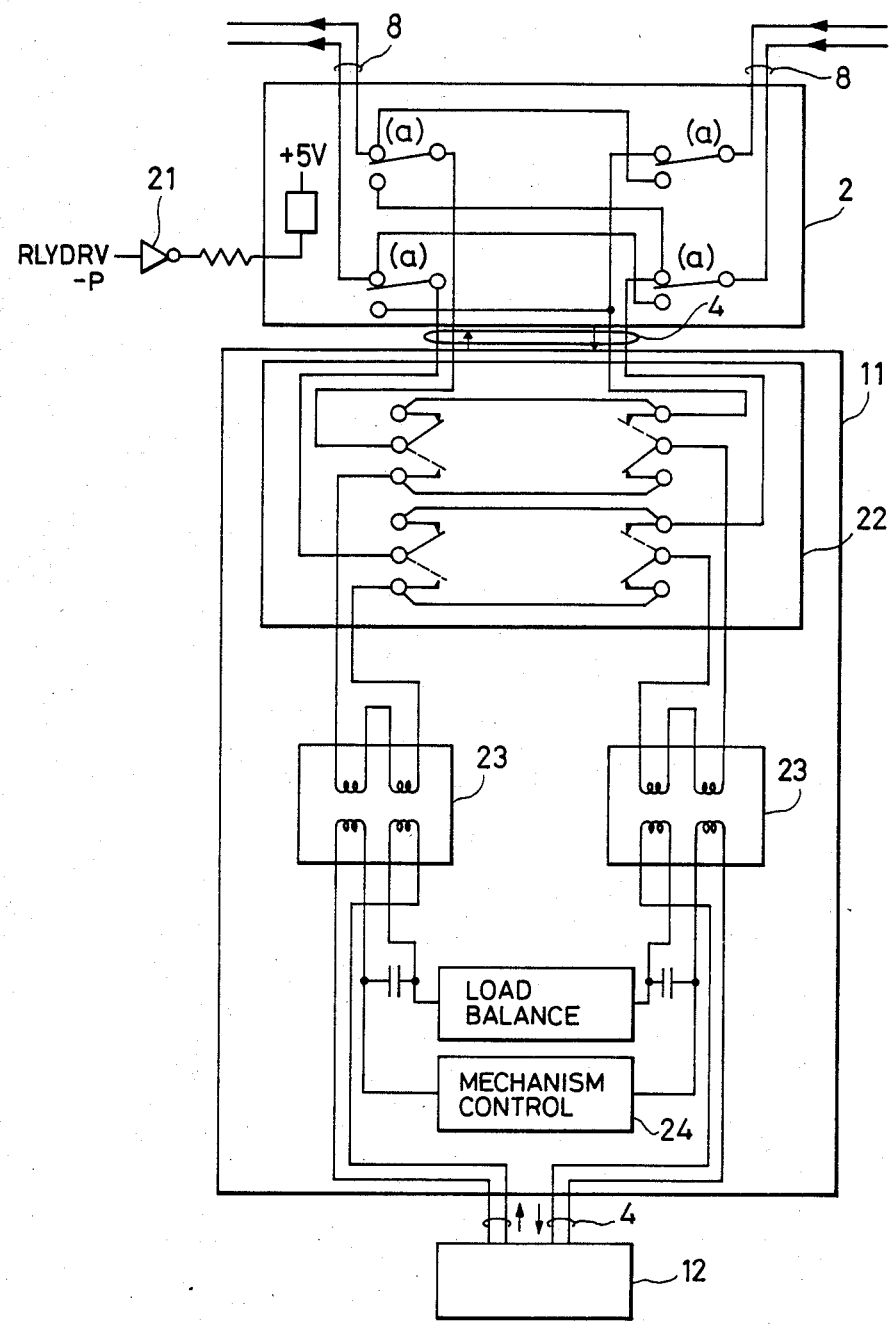
FIG. 3 is a diagram illustrating the structure of connection between the main ring and the ring subsidiary.

FIG. 3 is a diagram illustrating the structure of the ring subsidiary 4 and the structure of connection to the main ring 8. The terminal connector 11 consists of a terminal switch (relay) 22 and transformers 23, and its details have been disclosed in "Token Ring Access Method and Physical Layer Specifications", IEEE Standards, 802.5, 1985. Being served with a direct current from the terminal, station, a mechanism control 24 drives the terminal switch 22 so that the ring subsidiary 4 is connected to the main ring 8 (the condition of the terminal switch 22 indicated by dotted lines in FIG. 3). The novel feature of the present invention resides in the contrivance for opening and closing the ring connection switch 2 which is inserted between input lines and output lines of the main ring 8, to connect or disconnect the transmission line between the main ring 8 and the ring subsidiary 4. Reference numeral 21 denotes a relay driver of the ring connection switch 2. When the power source of the line concentrator 1 is turned off, an RLYDRV-P signal is not active and in this case, the contacts (a) of the relay switch are connected as shown. When the power source is turned on and the line concentrator 1 is not detecting the abnormal condition of the ring subsidiary 4, the RLYDRV-P signal is not active and even in this case, the contacts (a) of the relay switch are connected as shown.

When the power source is turned on and the line concentrator 1 detects an abnormal condition of the ring subsidiary 4, the RLYDRV-P signal becomes active and in this case, the contacts (a) of the relay switch are connected to the side opposite to the side shown in FIG. 3. That is, when the power source of the line concentrator 1 is turned off, the main ring 8 is connected to the ring subsidiary 4, and the terminal station connected to the ring subsidiary 4 is allowed to make communication with other terminal stations via the main ring 8. The same also holds true even when the power source of the line concentrator 1 is turned on and no abnormal condition is detected on the ring subsidiary 4. When the power source of the line concentrator 1 is turned on and an abnormal condition is found on the ring subsidiary 4, the connection between the main ring 8 and the ring subsidiary 4 is interrupted.

According to the present invention, the main ring can be connected to the ring subsidiary even when the power source of the line concentrator is turned off, enabling the terminal stations to continue the communications under this condition.

What is claimed is:

1. A ring configuration of a plurality of line concentrators comprising:
    a main ring which connects said plurality of line concentrators in the form of a ring;
    a plurality of ring subsidiaries connected to each line concentrator for connecting respective groups of terminal stations to said line concentrator;
    wherein said line concentrator includes a plurality of ring connection switches correspondingly connected between said ring subsidiaries and said main ring for connecting and disconnecting said main ring and said ring subsidiaries; and
    wherein each ring connection switch maintains connection between said main ring and a ring subsidiary when a power source of said line concentrator is turned off, so that said groups of terminal stations are allowed to maintain communication with other terminal stations via said main ring.

2. A ring configuration of line concentrators according to claim 1, wherein said ring connection switch includes a relay which is inserted between input lines and output lines of said main ring; and
    wherein said relay connects and disconnects said input and output lines of said main ring to and from said ring subsidiary.

3. A ring configuration of line concentrators according to claim 1, wherein terminal station of each group of terminal stations are connected in series to said ring subsidiary.

* * * * *